Aug. 5, 1952 — C. C. BALDWIN — 2,605,885
PORTABLE CONVEYER
Filed March 25, 1946
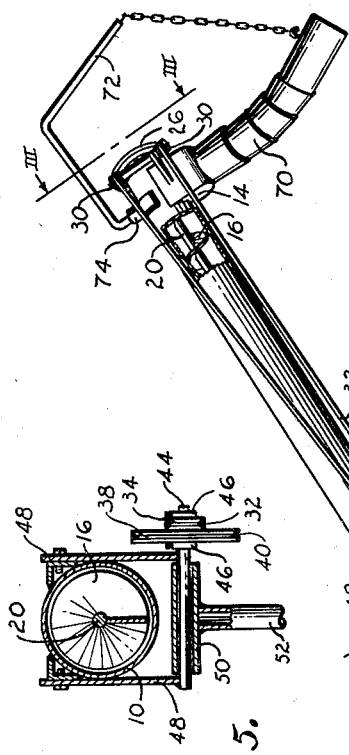
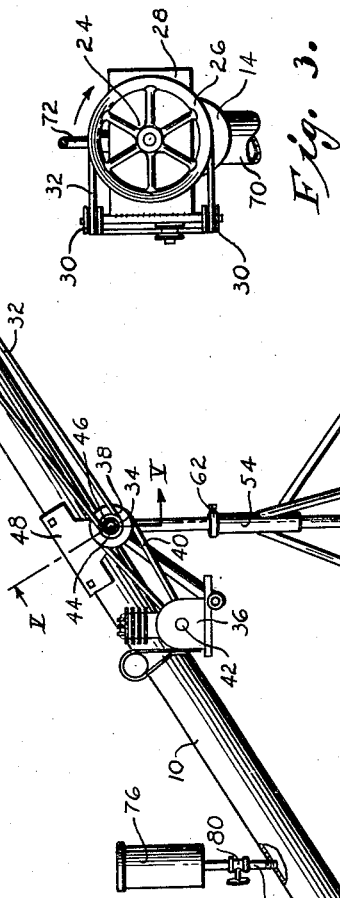
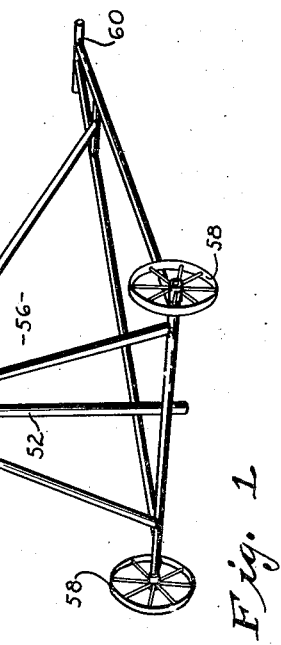
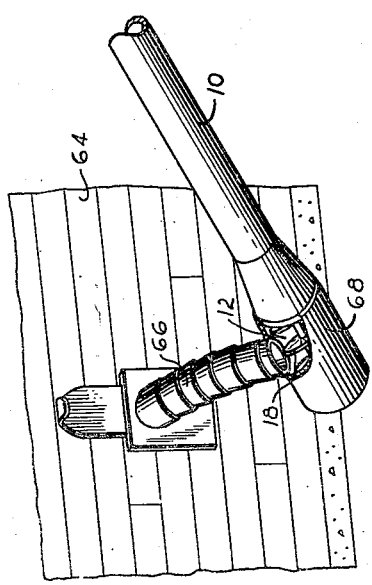
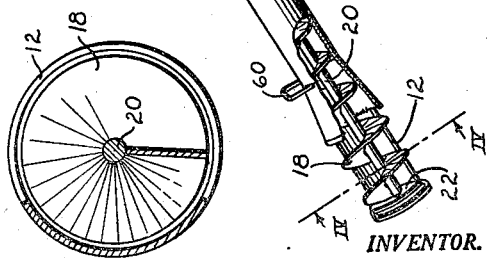
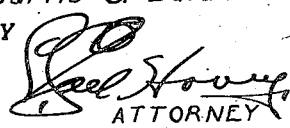
INVENTOR.
Curtis C. Baldwin
BY
ATTORNEY Patented Aug. 5, 1952

2,605,885

UNITED STATES PATENT OFFICE 2,605,885

PORTABLE CONVEYER

Curtis C. Baldwin, Whitney, Nebr., assignor to
C. Earl Hovey, trustee, Kansas City, Mo.

Application March 25, 1946, Serial No. 656,888

1 Claim. (Cl. 198—118)

This invention relates to equipment for handling grain or similar materials and has for its primary aim to provide a conveyor for comminuted substances where the same are to be elevated as well as shifted from one point to another.

One of the primary aims of this invention is to provide a material conveyor having a confining body that is uniquely mounted upon a supporting frame for rotation or tipping to the end that the extremities of the body may be positioned as desired with convenience and without exerting an objectionable amount of force.

This invention has for further aims to provide a material conveyor having a tubular body wherein is mounted a material motivating auger designed to have greater capacity at one end thereof than throughout the remaining portion of its length for the purpose of insuring a maximum amount of conveying ability when the device is in use; to provide a conveyor that is mounted upon a specially designed supporting frame whereon is also carried a prime mover for motivating the auger, which prime mover is so connected to the auger that shifting the tubular body of the conveyor will not require adjustment of the driving means extending between the prime mover and the auger; and to provide means at the outlet port of the tubular body for directing the material being handled into places requiring a curved or flexible conduit.

Other objects of the invention will become apparent during the course of the following specification referring to the accompanying drawing, wherein:

Fig. 1 is a perspective view of a material conveyor made pursuant to the present invention.

Fig. 2 is a perspective fragmentary view illustrating the manner in which the intake end of the conveyor may be adapted for a particular use.

Fig. 3 is a cross sectional view taken on line III—III of Fig. 1 and looking in the direction of the arrows.

Fig. 4 is a cross sectional view taken on line IV—IV of Fig. 1, looking in the direction of the arrows; and Fig. 5 is an irregular sectional view taken along line V—V of Fig. 1.

In the form of the invention chosen for illustration, the material conveyor comprises an attenuated tubular body 10 having a cutaway portion 12 at one end thereof to constitute an inlet port and an outlet port 14 at the opposite end thereof.

An auger 16 within tubular body 10 extends the full length thereof and has one end at outlet port 14 while the opposite end thereof is at inlet port 12. A portion 18 of this auger 16 is tapered outwardly at the intake end of body 10 as illustrated in Fig. 1. This tapered portion 18 progressively increases in diameter as the end of the auger is approached and merges with the remaining length of auger 16, all for the purpose of establishing a portion 18 having a greater conveying capacity than the remaining part of the auger. Thus, when the conveyor is in use, portion 18 will insure that a solid mass of material is always fed to auger 16 and therefore, maintain the output constant and at a maximum. Auger 16 has a shaft 20 extending longitudinally therethrough which is journaled in bearings 22 and 24 at the ends of body 10. Shaft 20 projects outwardly through the closed end of body 10 to support a pulley wheel 26, as clearly illustrated in Fig. 3.

A bracket 28 mounts a pair of sheave wheels 30 to one side of body 10 and it is over these sheave wheels 30 that endless belt 32 is passed when the said belt is passed around pulley wheel 26 and around sheave 34 disposed adjacent to an engine or suitable prime mover 36. Another sheave 38 rigid to sheave 34 receives belt 40 which in turn is in engagement with the shaft 42 of engine 36 through any well known medium such as another pulley wheel. The sheaves 34 and 38 are held against displacement from shaft 44 by collars 46 and when engine 36 is operating, motivating power for auger 16 will be transmitted through the parts just mentioned. Shaft 44 supports body 10, as clearly illustrated in Fig. 5.

A hanger 48 rigid to body 10 is welded or otherwise rigidly attached to shaft 44 which in turn is journaled in a bearing 50 at the upper end of standard 52. This standard 52 is vertically slidable in a sleeve 54 on the mobile supporting frame 56 having wheels 58 as a part thereof. A convenient handle 60 allows the entire conveyor to be moved from place to place by one person. Standard 52 is slidable through sleeve 54 and maintained in the desired position by a set collar 62 secured to standard 52 and allowing the same to freely rotate when collar 62 is positioned to maintain body 10 at a desired height. Body may be tipped about the axis of shaft 44 to position the ends thereof where desired and in the event it is necessary to convey grain for example, from a bin 64, body 10 is equipped with a flexible tube 66 that communicates with the intake port 12 of body 10 in a manner illustrated in Fig. 2. An apron 68 closes intake port 12 but has flexible pipe 66 secured thereto, as clearly illustrated. If grain is to be elevated from a pile or a truck body, inlet port 12 may be left as shown in Fig. 1 for the tapered portion 18 of auger 16 is exposed and will quickly collect the grain through intake port 12 for this said intake port extends substantially two-thirds of the way around body 10 when apron 68 is not in place. Body 10 is flared or tapered to accommodate the tapered portion 18 of auger 16 as illustrated in Figs. 1 and 2. When the grain or other material being conveyed is to be specially deposited, flexible tube 70 in communication with the outlet port of body 10 is disposed as needed through the medium of an adjustable arm 72, one end whereof is pivotally mounted on body 10 by boss 74.

Such arrangement of parts permits the sectional tube 70 to direct the material as needed. In many instances grain handlers desire to apply some form of treatment to the material as it passes along conveyor body 10.

With the structure made as just described and illustrated, a formaldehyde solution may be applied in controlled amounts from a reservoir 76 joined to body 10 by pipe 78 having a valve 80 therein. Thus, one of the diversified uses of the material conveyor is emphasized and since actual use of the equipment has further proven its advantages as a material conveyor, its versatility will become apparent to those skilled in the art.

But one form of the invention has been disclosed and since that form may be altered to suit conditions, it is desired to be limited only by the spirit of the invention and scope of the appended claim.

Having thus described my invention, what I claim as new and desire to secure by Letters Patent is:

In material equipment, a frame having a tubular sleeve; an elongated standard mounted in said sleeve for vertical adjustment and rotation on a vertical axis; a collar, vertically attachable to the standard and resting on the sleeve; a horizontal, tubular bearing rigid to the standard at the uppermost end thereof; a shaft rotatable in the bearing; a hanger rigidly secured to the shaft; elongated conveyor means mounted on the hanger, said conveyor means having movable parts; a pair of interconnected pulleys rotatably mounted on the shaft, one of the pulleys being adapted for connection with a prime mover; and means coupling the other pulley with said movable parts.

CURTIS C. BALDWIN.

REFERENCES CITED

The following references are of record in the file of this patent:

UNITED STATES PATENTS

| Number | Name | Date |
| --- | --- | --- |
| 862,874 | Beach | Aug. 13, 1907 |
| 1,165,460 | Steele | Dec. 28, 1915 |
| 1,321,123 | Parker | Nov. 11, 1919 |
| 1,955,238 | Jones | Apr. 17, 1934 |
| 2,364,353 | Escher | Dec. 5, 1944 |
| 2,395,410 | Kaesler | Feb. 26, 1946 |